United States Patent [19]

Geiger et al.

[11] 4,338,899

[45] Jul. 13, 1982

[54] METHOD AND APPARATUS FOR CONTROLLING THE IDLING OPERATION OF A SPARK-IGNITED INTERNAL COMBUSTION ENGINE

[75] Inventors: Istvan Geiger, Braunschweig; Klaus Stamm, Wolfsburg; Reinhard Brüning, Hamburg; Manfred Meyer, Norderstedt, all of Fed. Rep. of Germany

[73] Assignee: Volkswagenwerk Aktiengesellschaft, Fed. Rep. of Germany

[21] Appl. No.: 44,328

[22] Filed: May 31, 1979

[30] Foreign Application Priority Data

May 31, 1978 [DE] Fed. Rep. of Germany ....... 2823711

[51] Int. Cl.$^3$ .............................................. F02P 5/04
[52] U.S. Cl. .................................. 123/339; 123/418
[58] Field of Search ............... 123/117 R, 117 D, 418, 123/102, 118, 339, 148 E, 429

[56] References Cited

U.S. PATENT DOCUMENTS

| | | | |
|---|---|---|---|
| 3,554,170 | 1/1971 | Schenk | 123/429 X |
| 3,696,798 | 10/1972 | Bishop et al. | 123/382 X |
| 3,874,350 | 4/1975 | Shiraishi | 123/117 R |
| 4,048,964 | 9/1977 | Kissel | 123/139 E X |
| 4,085,714 | 4/1978 | Hattori et al. | 123/117 R |
| 4,104,998 | 8/1978 | Fenn | 123/117 R |
| 4,111,174 | 9/1978 | Fitzner et al. | 123/117 R X |
| 4,244,336 | 1/1981 | Fitzner | 123/602 X |

FOREIGN PATENT DOCUMENTS 2221374 11/1973 Fed. Rep. of Germany .

OTHER PUBLICATIONS

*Internal Combustion Engines*, by E. F. Obert, ©1968 by International Textbook Co., pp. 372, 382, 383.

*Primary Examiner*—Tony M. Argenbright
*Attorney, Agent, or Firm*—Brumbaugh, Graves, Donohue & Raymond

[57] ABSTRACT

The ignition timing of a spark-ignited internal combustion engine is controlled to have a stabilized idle speed which is approximately equal to a desired idle speed. In accordance with the invention the engine is supplied with a fuel-air mixture which has a high air ratio, exceeding the air ratio corresponding to maximum mean indicated pressure and hence maximum torque. The air ratio is in a range wherein an increased air ratio corresponds to decreased mean indicated pressure and consequently decreased torque. According to the invention, the ignition timing of the engine is controlled to linearly advance the timing from a nominal retarded condition in proposition to change in engine speed below the desired speed. The timing advance has the same ratio to engine speed change as the ratio of nominal ignition pulse spacing to the desired engine idle speed.

9 Claims, 11 Drawing Figures

METHOD AND APPARATUS FOR CONTROLLING THE IDLING OPERATION OF A SPARK-IGNITED INTERNAL COMBUSTION ENGINE

BACKGROUND OF THE INVENTION

This invention relates to a method for controlling the idling operation of a spark-ignited internal combustion engine, and particularly to such methods as make use of ignition pulse timing control in order to stabilize the engine idle speed.

German Patent Disclosure No. 2,221,354 discloses a method wherein engine spark-ignition timing is controlled to provide stabilization of the idle speed of an internal combustion engine. The disclosure is aimed particularly at engines wherein a change in engine load, which may result from the use of hydraulic power steering, causes a reduction in idle speed. In order to compensate for the increased load on the engine, the ignition timing of the engine is advanced to provide increased engine torque and increased engine speed.

Figure 1:
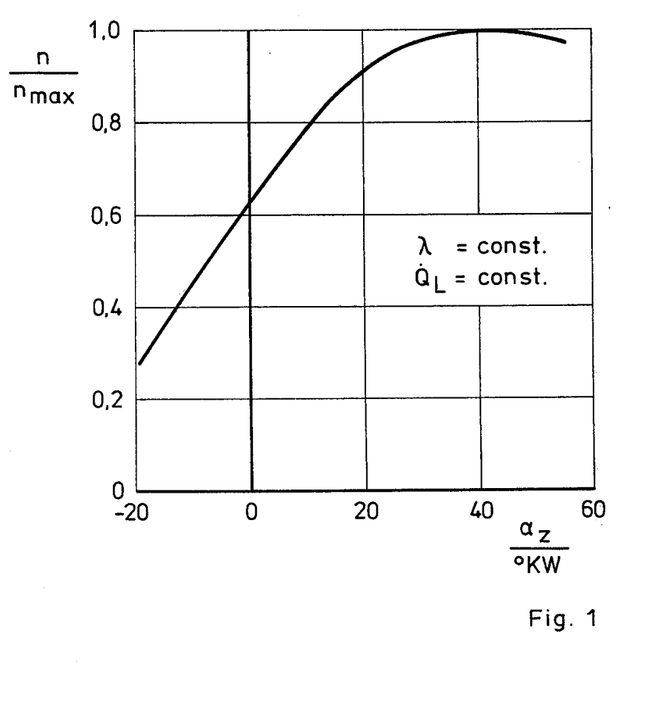
FIG. 1 is a graph indicating relative speed as a function of ignition timing.

This prior art ignition timing control method and apparatus makes use of the relationship between engine speed and ignition timing set forth in FIG. 1. FIG. 1 is a plot of engine speed n, relative to maximum speed $n_{max}$ available with constant air ratio and air volume throughput, as a function of ignition timing advancement $\alpha_z$ relative to top dead center. By reference to FIG. 1 it may be seen that engine idle speed n is approximately linearly related to ignition advancement $\alpha_z$ such that modification of the ignition angle $\alpha_z$ in the direction toward advance ignition (positive angles) will result in an increase in idle speed n over a relatively large angular variation up to a position of approximately 40° advance relative to top dead center, at which point a maximum engine speed $n_{max}$ will occur for the given air-fuel ratio $\lambda$ and air throughput $Q_L$.

Figure 2:
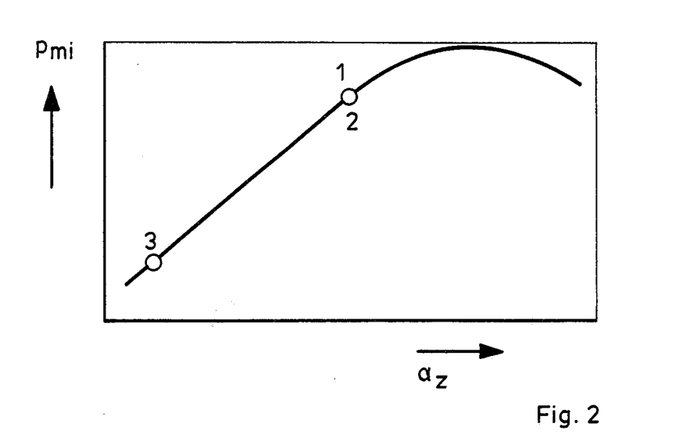
FIG. 2 is a graph indicating mean indicated pressure as a function of ignition timing.

FIG. 2 illustrates the relation between mean indicated pressure Pmi and ignition timing advancement $\alpha_z$ and indicates that approximately the same relationship is present between ignition timing advancement and mean indicated pressure, which is an indication of engine torque. Consequently, with increased ignition timing advancement $\alpha_z$ the engine torque output will also increase to a maximum.

The relationships of FIGS. 1 and 2 are used in accordance with the mentioned German patent disclosure for stabilization of the idling speed of an engine with variations in the load on the engine. In accordance with the method, the engine is forced to idle with considerably retarded ignition and the resulting output loss of the engine, on account of retarded ignition, is compensated for by an enlargement of the fuel and air charge supplied to the engine combustion chambers.

While the previously known arrangement for stabilizing idle speed is directed at variations in applied engine load, the purpose of the present invention is to provide a method for operating a spark-ignited internal combustion engine with a lean fuel-air mixture during engine idling. Such a mixture is desirable for reducing engine exhaust gas emissions, particularly carbon monoxide and hydrocarbons. Operation with such a lean fuel-air mixture can often result in variations of the air mixture, both time variations of the mixture supplied to one of the cylinders, and variation in the mixture supplied to various cylinders. Such variations in the fuel-air ratio supplied to the cylinders of the engine can result in rough engine operation and possibly even stalling of the engine during idling with such a lean mixture.

It is therefore an object of the present invention to provide a new and improved method for controlling the idling operation of a spark-ignited internal combustion engine.

It is a further object of the invention to provide such a method which reduces the pollutant emissions of the engine.

It is a further object of the invention to provide an apparatus for controlling the ignition timing of an internal combustion engine in accordance with the method of the invention.

SUMMARY OF THE INVENTION

In accordance with the invention there is provided a method for operating a spark-ignited internal combustion engine having a nominal angular spacing of ignition pulses in order to stabilize the actual idle speed to be approximately equal to a desired idle speed. According to the method of the invention the engine is supplied with a fuel-air mixture having a high air ratio, which exceeds the air ratio corresponding to maximum mean indicated pressure. The air ratio is in a range wherein increased air ratio corresponds to decreased mean indicated pressure. In accordance with the method, the ignition timing of the engine is controlled so that the timing is linearly advanced from a nominal retarded condition in accordance with the change in engine speed below the desired engine speed. The timing advance has the same ratio to engine speed change as the nominal ignition pulse spacing has to the desired idle speed.

In order to facilitate starting of the engine it is preferable that the ignition timing be advanced only when the engine speed exceeds a prescribed minimum idle speed. According to the invention the ignition timing advance may also be controlled to regulate the idle speed as a function of engine temperature, in order to provide an increased idle speed when the engine is cold.

In accordance with the invention there is provided apparatus for controlling the ignition timing of an internal combustion engine to advance the crankshaft angle of the timing from a nominal retarded condition as a function of engine idle speed change below a desired engine speed. The angle advance is proportional to speed change and has a ratio equal to the ratio of the angular crankshaft spacing of ignition pulses to the desired idle speed. The apparatus includes a pulse generator for providing periodic first pulses representative of angular crankshaft position. There is also provided a first delay circuit responsive to and reset by a first edge of each of said first pulses and, unless reset, providing second output pulses each having a first edge delayed from said first edge of each of said first pulses by a first time period corresponding to the nominal angular crankshaft spacing of ignition pulses divided by the desired idle speed. Means, responsive to supplied pulses, are provided for controlling the ignition timing. Finally, there is provided means for supplying the earlier of the first pulses and the second pulses to the ignition timing control means.

According to a preferred embodiment there may also be provided means, including a second delay circuit having a second time period corresponding to the angular spacing of ignition pulses divided by a minimum engine speed, for providing a control signal when the interval between the first pulses is less than the time period. In this embodiment the means for supplying pulses to the ignition timing control means supplies only the first pulses in response to the control signal.

There may also be provided a third delay circuit having the same time period as the first delay circuit and responsive to a second edge of the first pulses for generating third pulses. The means for supplying pulses to the ignition timing control means would then include combining means, responsive to the second and third pulses, for formimg fourth pulses having first and second edges delayed from corresponding first and second edges of the first pulses by the first time period. There may also be provided means for varying at least one of the time periods, including delay control means, responsive to engine temperature, and switch means, responsive to the delay control means, for connecting time constant determining components to at least one of the delay circuits.

The present invention is based on the fact that the reason for the occurrence of high emissions, in particular carbon monoxide and hydrocarbons, is the result of the supply of a rich mixture to the internal combustion engine during idling operation. Such a rich mixture is required for proper operation of the engine during idling in accordance with known operating methods. When a rich mixture is provided to the engine during idling, the richness of the mixture cannot be abruptly modified for purposes of operation of the engine in the driving range. Hence, excessively rich mixture is provided during the driving range of operation resulting in high carbon monoxide and hydrocarbon emissions.

Figure 3:
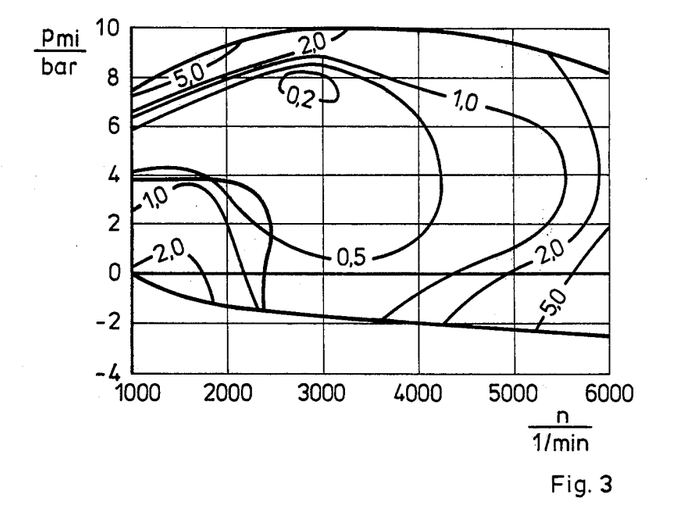
FIG. 3 is a graph of mean indicated pressure and engine speed, indicating contours of engine pollutant emissions.

By reference to FIG. 3, which is a plot of mean indicated pressure against speed of the internal combustion engine, showing curves of constant carbon monoxide emission, it can be seen that for known methods of operating the vehicle internal combustion engine there occur high emission values for carbon monoxide in all the operating ranges of interest, as specified by engine speed and mean pressure, which corresponds to engine load. Thus, for engine idling, partial load, and full load, each condition includes a range of high emission values.

Figure 4:
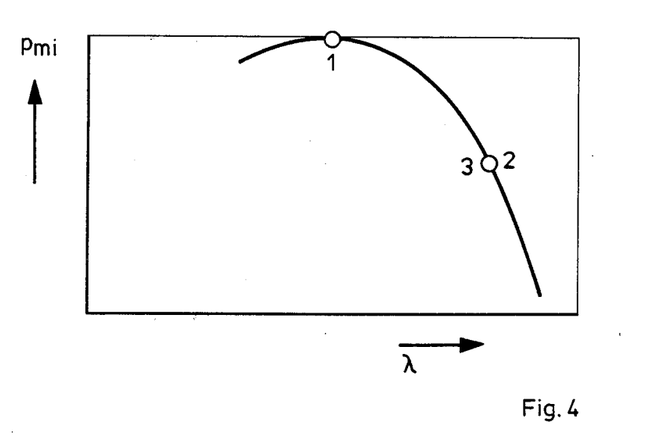
FIG. 4 is a graph of mean indicated pressure as a function of mean air ratio.

In accordance with the present invention the engine is provided with a lean idling mixture having a high air ratio in order to decrease the emission of noxious substances, such as carbon monoxide and hydrocarbons. Referring to FIG. 4 which is a graph showing the variation of mean indicated pressure Pmi with respect to air ratio $\lambda$, it may be seen that the working point of the present method of operating an engine is in the sloping down region of the curve which corresponds to a mean air ratio in the range of the point indicated by 2, which is higher than the mean air ratio 1 corresponding to the highest mean indicated pressure, and hence highest engine torque. Thus, the working point as far as mean air ratio is concerned is at a point where increased air ratio corresponds to greatly decreased mean indicating pressure and hence decreased engine torque.

Figure 5:
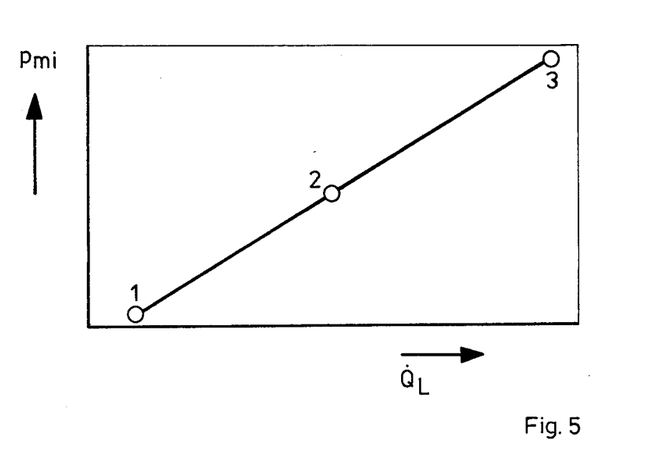
FIG. 5 is a graph of mean indicated pressure as a function of air throughput.

FIG. 5 is a graph of mean indicated pressure Pmi or engine torque as a function of air throughput $Q_L$ and shows that the loss in engine torque which results from the use of high air ratio, as indicated in FIG. 4, can be compensated for by an increase in air throughput through the engine, as is indicated by the plot of FIG. 5.

Referring to the graphs of FIGS. 2, 4 and 5, the point 1 in each graph indicates the customary operating condition of a vehicle with an internal combustion engine in accordance with the prior art. This point is the customary idle adjustment point with a rich mixture (a small air ratio $\lambda$) and a relatively small air throughput $Q_L$. For this idling adjustment, modifications of the air ratio $\lambda$ of the mixture provided to the internal combustion engine with time, or modifications in the mixture provided to various cylinders of the engine, do not seriously affect the operation of the engine, since there is a relatively low variation of torque with variations in mean air ratio, as may be seen in FIG. 4. While this characteristic is favorable by itself, it results in relatively high ratios of engine emissions in the exhaust.

The same condition of a rich idling mixture provided to the engine applies to the previously referred to patent disclosure, in that the increase in the idling air throttle cross section provided in that case in order to compensate for a retarded ignition point during idling, does not imply a modification of the air ratio, but only a modification of the charge provided to the engine.

In accordance with the present invention, the air ratio is adjusted to be greater than a stoichiometric mixture so that in accordance with FIG. 4 a working point 2 on the downwardly sloping side of the curve results. This air ratio results in a decrease in the mean pressure and engine torque so that the engine produces considerably less power and the fuel component in the mixture is bearly sufficient for ignition. Therefore there is a danger that fluctuations in the air ratio will further reduce the mean indicated pressure and result in stalling of the engine. As previously indicated with respect to FIG. 5, this torque loss can be compensated for by increasing the air throughput.

If the ignition point during idling, for an engine operating with a lean mixture according to the invention, were placed in a relatively early position, that is the spark is fairly advanced such as indicated by point 1 in FIG. 2, it would not be possible to provide the compensation according to the curve of FIG. 2 for the torque loss which occurs due to the increased leanness of the idling mixture as indicated in FIG. 4. Starting from the point 1 of FIG. 2 increase advancement of the ignition timing would bring the timing near the maximum point of the curve and further change or advancement of the ignition point would no longer provide operation of the engine in the desired range. The point indicated as position 2 in the diagram of FIG. 2, which is associated with the variables indicated as point 2 in the drawings of FIGS. 4 and 5 would thus correspond to the normal operating point 1, for the normal ignition timing during idling.

Therefore, the method in accordance with the invention starts with a relatively late ignition point, that is, a retarded ignition which is indicated as point 3 in FIG. 2. This ignition point is clearly on the portion of the torque curve which provided for increased torque with increased ignition timing advancement.

While a relatively late ignition point is referred to, it should be understood that the ignition point 3 need not be delayed relative to top dead center, but relatively late can include points as indicated in FIG. 1, which are advanced with respect to top dead center. A selection of the ignition timing point naturally depends on the torque and speed curves for the individual engine.

The choice of the retarded initial value for the ignition timing point 3, indicated in FIG. 2, enables variation of the spark advance over a wide range with consequent variation in the mean indicated pressure and output torque of the engine between the points 3 and 1 on the diagram of FIG. 2. This variation of the ignition advance not only can take care of changes in engine speed and torque which result from variations in the intake mixture, but can also accommodate variations in engine speed which arise from variations in engine load during idling.

The decrease in mean indicated pressure and consequent decrease in torque as the result of the use of a nominal ignition angle designated as 3 in FIG. 2 is compensated for by an increase in the air throughput from the point 2 to the point 3 as indicated in FIG. 5.

An important characteristic of the method in accordance with the present invention is the advancing of the ignition point as speed of the internal combustion engine decreases in keeping with a linear relationship. The linear relationship has a ratio which is defined by the nominal crankshaft angle between ignition pulses of the internal combustion engine divided by the desired value of the idling speed. Assuming a four cylinder four-stroke piston engine, using a customary breaker contact as a pulse generator, wherein the ignition of each cylinder occurs on each second rotation of the crankshaft, (720° crankshaft angle), the breaker contact is actuated every 180° crankshaft angle to account for all four cylinders of the engine. The time between two contact actuations is consequently related to the idling speed. Referring to the examples given, the prescribed value of the idling speed could be selected as, for example, 1,000 rpm. Thus, there is an idle timing advancement of 18° crankshaft angle for every 100 rpm that the engine speed is reduced below 1,000 rpm. This linear control characteristic in conjunction with a lean idling mixture, has been found to be an optimal compromise between low consumption, favorable emissions and technical practicability. The arrangement according to the invention need only sense the changes below the reference in idling speed, by sampling the time between breaker contact pulses, and provide a correction to the ignition timing in order to provide the necessary advance in accordance with the linear relationship.

The advance of the timing according to the invention is a function of the desired value of the idling speed. It is possible in accordance with the invention to account for other influencing factors which affect the operation of the internal combustion engine idle, for example, engine temperature. Engine temperature may be sensed directly by reference to a device for sensing the temperature of the engine coolant, or indirectly, by the position of a starting device, or the air throughput influenced by a starting device, such as a choke. Having sensed a temperature, it is possible to change the value of the desired idling speed between upper and lower values either continuously or in one or more steps. Accordingly, upon cold starting, a higher prescribed value for engine idling speed can be used than when the internal combustion engine is warm. On cold starting, there results a flatter control characteristics slope than when the engine is warm, since the engine timing advancement is linearly related to engine speed change according to a factor that is inversely dependent on the desired idling speed.

Another advantage of the method in accordance with the invention is the fact that the timing control does not adversely affect starting of the internal combustion engine. A drop in the idling speed of the engine leads to an adjustment of the ignition point toward a more advanced ignition in accordance with the method of the invention, and thereby results in an idling speed stabilizing effect so that the pertinent speed decrease below the desired idle speed is limited to a small value which is a function of the fluctuation of the air ratio and the outside load. The adjustment according to idling speed when applied to cranking speed may result in an ignition advance which is different from the ignition timing value which would be optimum for engine starting. In order to provide for engine starting, there is provided a cut off of the advance of the ignition point in accordance with the invention, when the engine is turning below a prescribed minimum idling speed.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENT OF THE INVENTION

For an interpretation of the individual circuit components as illustrated in the accompanying drawings, reference is made to a book entitled "Electronik 1978", Vol. 1, pages 85 and following. In the subsequent description, the terms "voltage pulse" or "pulse" are utilized in connection with either positive or negative going changes in voltage, including voltages which before or after the change are at ground level.

Figure 6:
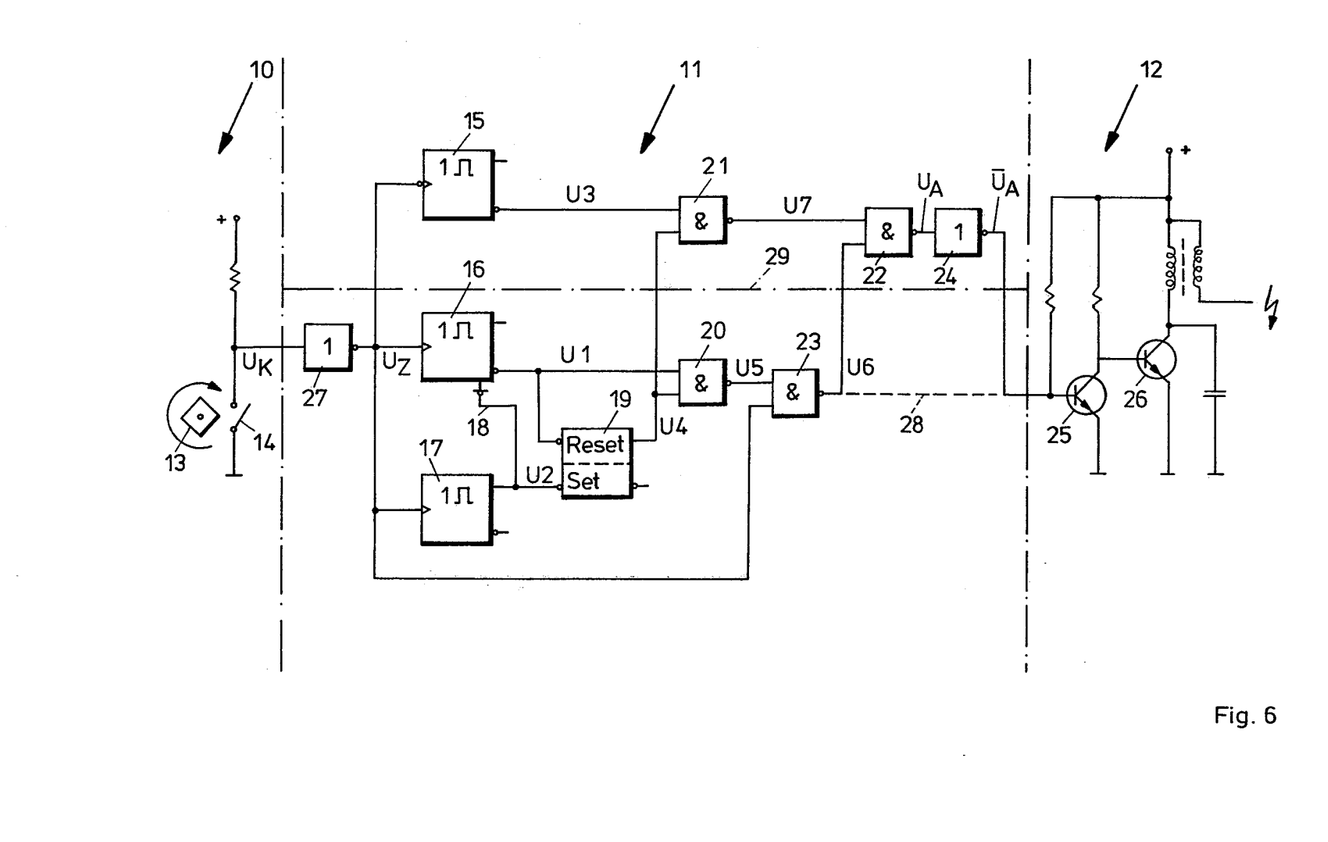
FIG. 6 is a schematic diagram of an apparatus for controlling the ignition timing of an internal combustion engine in accordance with the present invention.

FIG. 6 is a circuit diagram indicating the principal components of an apparatus for regulating timing of an internal combustion engine in accordance with the present invention. The circuit of FIG. 6 includes three major circuit portions, the triggering circuit 10, the time comparison logic circuit 11, and the ignition circuit 12. The ignition circuit 12 and triggering circuit 10 are of the type well known in the art. The triggering circuit 10 includes a contact breaker 14 actuated periodically and speed dependently by the contact breaker cam 13 which is mechanically driven by an engine crankshaft. The contact breaker 14 delivers periodic first pulses to retriggerable timing elements 15, 16 and 17. Ignition circuit 12 includes transistor amplifiers 25 and 26 which control the delivery of a high voltage spark. The pulses delivered to the retriggerable timing elements 15, 16 and 17 are inverted from the pulses generated by the contact breaker by inverter 27. Circuits 15, 16 and 17 are monostable multi-vibrators which will change state upon triggering and remain in the changed astable state for a selected time period after triggering. Timing element 16 responds to the first or leading edge of the supplied first pulses to generate second output pulses which are delayed by a period corresponding to the time between ignition pulses at the desired idle speed of the engine. The first or leading edge of the second pulses is delayed from the leading edge of the first pulses by this time period. The pulses output from the first time delay circuit 16 are supplied to ignition circuit 12 following a series of additional control steps which will be described below.

Delay circuit 17, flip-flop 19, and NAND gates 20 and 21 are provided to disable the ignition timing circuit when the engine is operating at a speed lower than a prescribed minimum idle speed, as will be described below. When the engine is operating at a speed in excess of the minimum idle speed, delay circuit 17, flip-flop 19 and NAND gate 20 serve only to invert the output pulse of delay circuit 16, and provide the inverted pulse U5 to NAND gate 23. NAND gate 23 has an output which changes in response to the earlier of the first edge of the first pulses or the first edge of the inverted second pulses supplied from NAND gate 20, and provides an output with a first edge whih is the earlier of the first edge of the first or second pulses. Delay circuit 15 and gates 21 and 22 and inverter 24 are used to regulate the pulse duration of the pulse supplied to ignition circuit 12. These circuits are optional, and it is possible to supply the output of NAND gate 23 directly to ignition circuit 12 by the bridge connection indicated in dotted lines as 28 when it is not necessary to regulate the ignition pulse duration.

Delay circuit 17 and control elements 19, 20 and 21 are provided in order to discontinue the operation of the timing circuit of the invention when the engine is turning at a rate below a selected minimum idle speed. The time constant of delay circuit 17 corresponds to the time between ignition pulses when the engine is turning at the minimum idle speed. As long as the engine is turning at a rate which is in excess of this speed the first pulses which are supplied to circuit 17 constantly reset circuit 17 into its astable state, and there is no output pulses from circuit 17. When the speed of the engine is below the minimum idle speed, circuit 17 triggers after its time period and provides an output pulse U2 which sets flip-flop 19, and also, by line 18, provides an inhibit signal to block the output of timing circuit 16. Setting of flip-flop 19 provides a control signal designated U4 to gates 20 and 21 which prevents the further delivery of output pulses from these circuits and sets the output of gate 20 in a suitable state to enable gate 23 to pass the supplied first pulses directly to the ignition circuit 12 or to the ignition circuit 12 through properly set gate 22 and inverter 24. Thus, when the engine is turning at a rate which is less than the minimum idle speed, the output from timing circuit 17 blocks the usual timing regulation function of circuit 11, and directly passes the first pulses to the ingition circuit so that the timing is in its nominal condition without the advancement which would result from the use of the circuit.

The portions of circuit 11 above dotted line 29 are provided when it is necessary or desirable to supply ignition circuit 12 with pulses having the same duration as the first pulses supplied by triggering circuit 10. Time delay circuit 15 has the same time constant as circuit 16, but responds to a second, falling edge of the first pulses to provide third pulses U3 to gate 21. The third pulses have an edge which is delayed by the time constant from the second edge of the first pulses and are supplied by gate 21 in inverted form U7 to gate 22 where they are combined with the output pulses of timing circuit 16 in order to form reshaped fourth pulses having first and second edges, each delayed from corresponding first and second edges of the first pulses by the first time constant and therefore having the same duration as the original first pulses supplied to inverter 27. This pulse duration corresponds to the dwell time of the ignition circuit.

Figure 7:
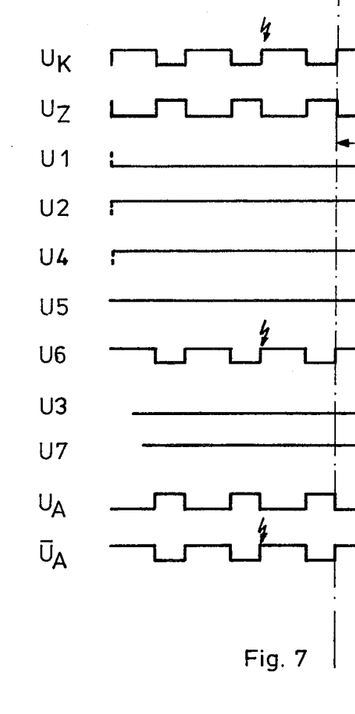
FIG. 7 is a graph illustrating the electrical pulses in the FIG. 6 apparatus for operation of an engine above the desired idle speed.
Figure 8:
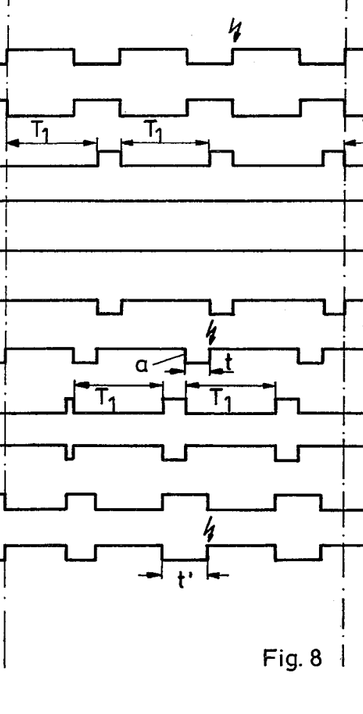
FIG. 8 is a graph illustrating the electrical pulses in the FIG. 6 apparatus for operation of an internal combustion engine at speeds below the desired idle speed, but above the minimum idle speed.
Figure 9:
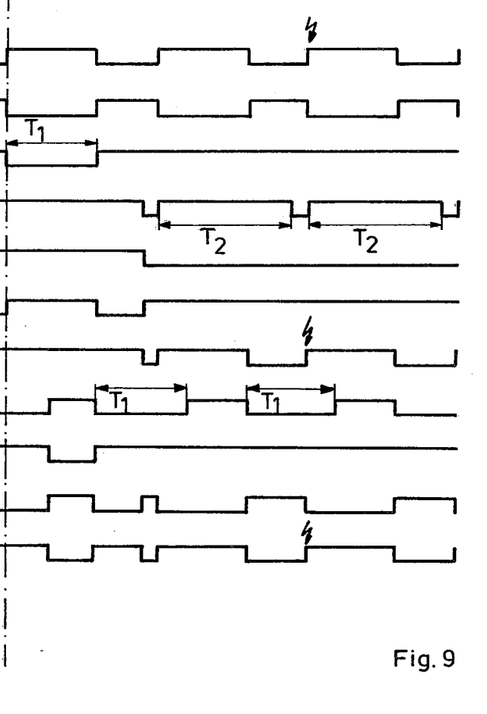
FIG. 9 is a graph illustrating the electrical pulses in the FIG. 6 apparatus for operation of an internal combustion engine below the minimum speed.

The pulse diagrams of FIGS. 7, 8 and 9 illustrate the various pulses in the FIG. 6 timing circuit during operation of the engine at various speeds. FIG. 7 corresponds to operation of the engine at a speed which is in excess of the desired idling speed. Under this condition the first pulses $U_k$ from breaker 14 are provided to inverter 27 which forms inverted first pulses $U_z$. These first pulses are simultaneously supplied to time delay circuits 15, 16 and 17, and, because of the engine speed, have a period which is less than the period of these time delay circuits. Consequently circuits 15, 16 and 17 remain in their astable state, and are constantly retriggered by the first pulses at a period which is less than their respective time delay periods. The first pulses are also supplied to NAND gate 23, which is maintained in a suitable state by the outputs of time delay circuits 16 and 17, and provides output pulses U6, which correspond to an inverted set of the first pulses supplied from inverter 27. Time delay 15 is likewise in a stable condition and NAND gate 22 provides output pulses $U_A$ which are the inversion of pulses of U6. These are again inverted in inverter 24 and pulses $\overline{U}_A$, which are supplied to ignition circuit 12 correspond in time and shape to original first pulses $U_K$. For conditions of engine operation and speeds in excess of the desired idle speed, the pulses supplied to ignition circuit 12 therefore correspond precisely to the pulses supplied from breaker circuit 10.

FIG. 8 shows the pulses in the circuit of FIG. 6 for the condition where the speed of the internal combustion engine is less than the desired idle speed, but greater than the minimum idle speed. In this condition, the timing circuit 11 is operative to advance the ignition timing in accordance with the method of the present invention. As before, the inverted first pulses, which are output from inverter 27, are supplied to time delay circuits 15, 16 and 17. The pulses have a frequency which corresponds to a period less than the time delay period of the circuit 17, since the engine is operating at a speed in excess of the minimum idle speed, and circuit 17 is constantly retriggered into its astable state. The output U2 of circuit 17, and the resulting output U4 of flip-flop 19 will remain in a stable condition. Thus, gates 20 and 21 will continue to have an input which passes supplied pulses on with a mere inversion in pulse polarity.

For this condition of operation, the time between the first pulses is less than the time constant for the time delay circuit 15 and 16. As a result, circuit 16 returns to its stable state after its time delay period, providing second pulses designated U1 in FIG. 8. Pulses U1 corresponds to the return of the delay circuit 16 to its stable condition, and have a first edge which is delayed from the first edge of the first pulse by the time period $T_1$ of the circuit 16, which corresponds to the crankshaft angle between ignition pulses divided by the desired idling speed of the engine. The second pulses U1 are provided by gate 20 to NAND gate 23, which will respond to the first to occur of the first edge of the first pulses or the first edge of the second pulses. Since the time delay of the second pulses is less than the time between the first pulses, the output U6 of gate 23 will change state at a time which corresponds to the first edge of second pulses U1. This causes an advance of ignition timing between the first and second pulses, which is emphasized by the arrows in FIG. 8. Pulses U6 output from gate 23 have the correct first edge timing to trigger ignition circuit 12, but have the same second edge a as the first pulses $U_K$ and hence have a short dwell time t. Therefore these second pulses may not be suitable for use with certain types of ignition circuits 12 which require a fixed dwell time.

Because the time between pulses for the first pulses is less than the time constant of circuit 15, there will also be provided output third pulses U3 to gate 21, which have a second edge corresponding to the second edge of the first pulses delayed by the time constant of circuit 15. These pulses are provided to gate circuit 21 and relayed by circuit 21 as inverted pulses U7 to NAND gate 22. In NAND gate 22 pulses U6 and U7 are combined to form fourth pulses $U_A$ shown in FIG. 8 which have both first and second edges which correspond to the delayed first and second edges of the first pulses, and consequently have a pulse duration t' which corresponds to the pulse duration of the first pulses. Thus, the dwell time for the ignition circuit is maintained constant. After inversion in inverter 24 these output pulses are provided to ignition circuit 12.

FIG. 9 illustrates the pulse conditions for the FIG. 6 circuit for the condition wherein the engine is operating or being rotated at a speed which is less than the minimum idle speed for the engine. This condition is most likely to occur prior to starting of the engine, while the engine is being cranked by the starter motor. When the engine is cranking at a speed which is below its minimum idle speed, it is undesirable to have the linear ignition timing advancement of the present invention, because such advancement may provide for an ignition timing which is non-optimum for starting of the engine. Accordingly, when the engine is operating or cranking below its minimum idle speed, timing circuit 17 provides a control signal which disables the ignition timing advancement mechanism of the FIG. 6 circuit, and provides the original first pulses to the ignition circuit 12. Under this condition the first pulses $U_Z$, which are provided to circuit 17, provide an output pulse designated U2 when circuit 17 returns to its stable condition after its time delay period $T_2$, which corresponds to the nominal time between ignition pulses at the minimum idle speed. The change of state of the output of circuit 17 provides an inhibit signal on line 18 to timing circuit 16, causing the second pulses U1 to remain fixed, and setting flip-flop 19 so that output U4 changes state, thereby changing the condition of NAND gates 20 and 21. Thus the outputs of these gates, U5 and U7, remain in a stable condition, which facilitate the passage of the first pulses through NAND gates 23, 22 and inverter 24 to ignition circuit 12. Thus, the timing of pulses supplied to ignition circuit 12, after the first time delay of circuit 17, correspond precisely to the first pulses supplied to the timing circuit 11.

Those skilled in the art will recognize that time delay circuits 15, 16 and 17, which have been described as monostable multivibrators, may also be in the form of counters, which are provided with timing signals in addition to the first pulses output from the converter 27. It will also be recognized that the current invention may be practiced by the use of bridge circuit 28, bypassing the components above the dotted line 29 in circuit 11 of FIG. 6. The circuit components above the dotted line are provided only to stabilize the pulse duration provided to ignition circuit 12, for use in circuits wherein dwell angle control is necessary because of the use of a limited supply voltage in the ignition control in order to avoid energy losses in excess of those necessary to charge the coil.

Figure 10:
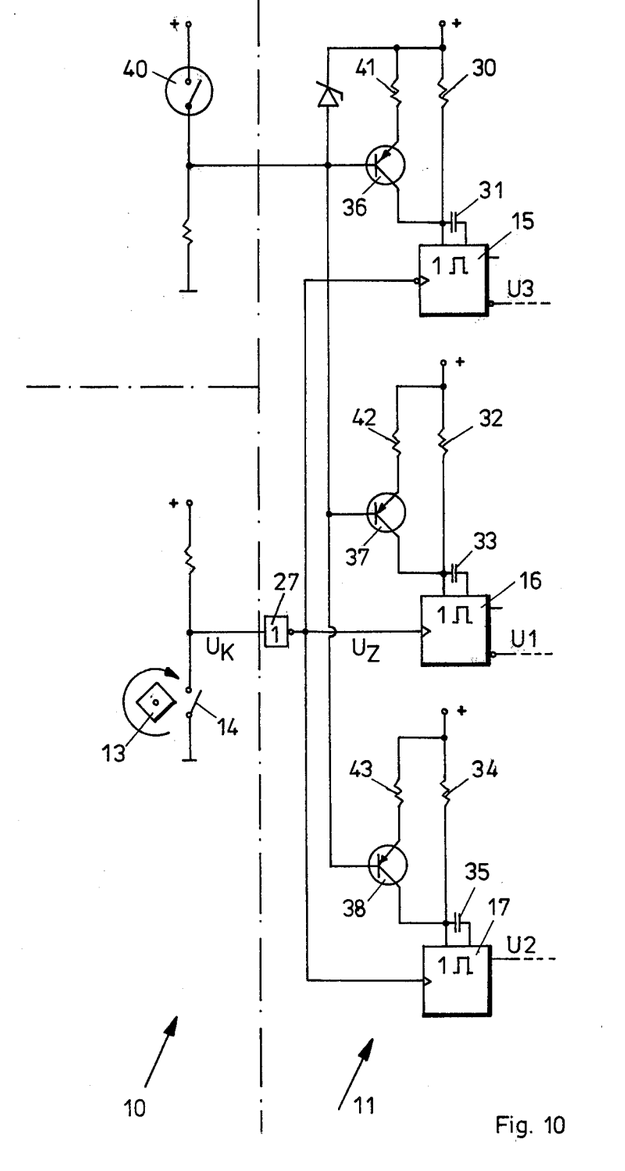
FIG. 10 is a schematic diagram illustrating a modification to the circuit of FIG. 6, which provided increased idle speed when the engine is cold.

FIG. 10 shows the triggering circuit 10 and portions of the timing circuit 11 including timing control circuits 15, 16 and 17. In addition, there are shown time delay determining components, including resistors 30, 32 and 34 and capacitors 31, 33 and 35 which are connected to the time delay circuits 15, 16 and 17. There is further provided in the FIG. 10 circuit a thermostatic switch 40 for detecting the temperature condition of the vehicle internal combution engine, and providing a signal representative of whether or not the engine is at its normal operating temperature. The output of the thermostatic switch 40 is connected to switching transistors 36, 37 and 38, which provide for connection of additional circuit components, for example resistors 41, 42 and 43, in the time delay determining circuits. These additional components tend to shorten the time delay of the circuits and thereby change the desired values for the idle speed and the minimum idle speed. Thus, for example, when the engine of the vehicle is in a cold start condition, switch 40 is open and switching transistors 36, 37 and 38 are in their conducting state, so that additional resistors 41, 42 and 43 are connected in the time determining circuits of timing circuits 15, 16 and 17. As a result the minimum idle speed determined by circuit 17 and the desired idle speed determined by circuits 15 and 16 is higher than the speeds which would have been determined without components 41, 42 and 43. When the engine reaches its normal operating condition, thermostatic switch 40 closes and the voltage applied to transistors 36, 37 and 38 causes these transistors to become a non-conducting, in which case the time constant of the circuits 15, 16 and 17 is increased thereby lowering the desired and minimum idle speeds associated with the circuits.

Figure 11:
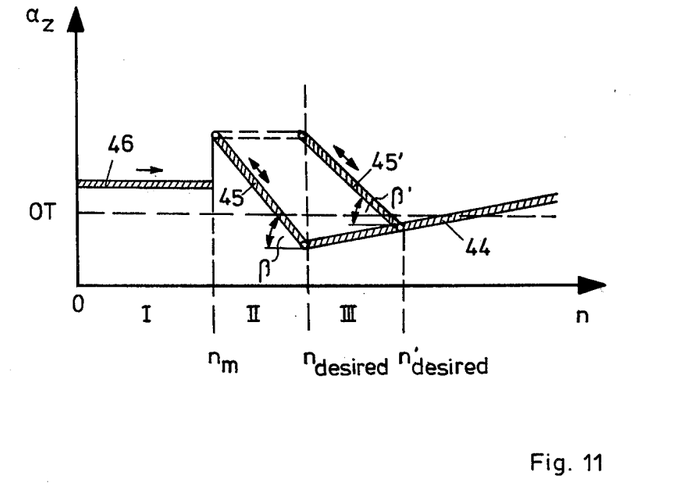
FIG. 11 is a graph showing the variations in ignition timing for the circuits of FIGS. 6 and 10.

FIG. 11 is a graph indicating ignition timing as a function of engine speed. The graph is divided into three zones, a first zone I which represents engine speeds below the minimum idle speed. In this range the ignition timing 46 is independent of engine speed, and is the timing provided by the breaker points 13 and 14 which consist of the first pulses. In a second range II, the engine is idling, and the ignition timing 45 is advanced for slower idle speeds and retarded for higher idle speeds with a slope $\beta$. Accordingly, the idle speed is automatically stabilized by the circuit of FIG. 6, since the advance of timing upon a slower idle speed will tend to increase the idle speed. In a still higher zone III, the engine is in its usual operating condition, and the ignition timing 44 varies normally to an advanced timing with increased engine speed. When the internal combustion engine is in a cold starting condition, the nominal idle speed is changed by use of the circuit of FIG. 10, and the minimum idle speed may also be changed, so that there exists a different curve 45' with a slope $\beta'$ for operation of the engine in the idling condition.

From the foregoing it will become apparent that the invention facilitates adjustment of various operating conditions of the internal combustion engine by means of circuit elements. It will be evident to those skilled in the art that, by variations of the invention, it is possible to operate with more than one idle speed, for example an idle speed to be selected in accordance with the condition of an automatic transmission.

In the foregoing description there have not been provided details on the selection of integrated circuits for use as monostable multivibrators, bistable multivibrators, NAND gates and inverters, since these logic components are well known to those skilled in the art, and can easily be selected to perform the functions described with respect to the FIG. 6 diagram.

While there have been described what are believed to be the preferred embodiments of the invention, those skilled in the art will recognize that other and further modifications may be made thereto without departing from the spirit of the invention and it is intended to claim all such embodiments as fall within the true scope of the invention.

We claim:

1. A method for operating a spark-ignited internal combustion engine with ignition means and having nominal angular spacing of ignition pulses to stabilize the actual idle speed to be equal to a desired idle speed, said method comprising:
   supplying said engine with a lean fuel-air mixture in the vicinity of said ignition means, said mixture having an air ratio exceeding the air ratio corresponding to a stoichiometric mixture, in a range wherein increased air ratio corresponds to decreased mean indicated pressure;
   and controlling the ignition timing of said engine to linearly advance said timing from a relatively late condition in accordance with change in engine speed below the desired speed; said timing advance having the same ratio to said engine speed change as the nominal ignition pulse spacing has to said desired idle speed.

2. The method according to claim 1 wherein said ignition timing is advanced only when said engine speed exceeds a prescribed minimum speed.

3. The method according to claim 1 or claim 2 wherein said ignition timing advance is further controlled as a function of engine temperature.

4. The method according to claim 3 wherein said control as a function of engine temperature comprises selecting a higher value of desired idle speed when said engine is cold.

5. Apparatus for controlling the ignition timing of an internal combustion engine to advance the crankshaft angle of the timing from a relatively late condition as a function of engine idle speed change below a desired engine speed, said angle advance being proportional to speed change by a ratio equal to the ratio of the angular crankshaft spacing of ignition pulses to the desired idle speed, comprising:
   a pulse generator, for providing periodic first pulses representative of angular crankshaft position;
   a first delay circuit responsive to, and reset by, a first edge of said first pulses and, unless reset before providing second output pulses having a first edge delayed from said first edge of said first pulses by a first time period corresponding to the angular crankshaft spacing of ignition pulses divided by said desired idle speed;
   means, reponsive to supplied pulses, for controlling said ignition timing;
   and means for supplying the earlier of said first or said second pulses to said ignition timing control means.

6. Apparatus as specified in claim 5 wherein there is further provided means, including a second delay circuit having a second time period corresponding to the angular spacing of ignition pulses divided by a minimum engine speed for providing a control signal when the interval between said first pulses is less than said time period, and wherein said supplying means supplies said first pulses to said ignition control means in response to said control signal.

7. Apparatus as specified in claim 5 or claim 6 wherein there is provided means, including a third delay circuit having said first time period and responsive to a second edge of said first pulses, for generating third pulses having an edge delayed from said second edge by said first time period, and wherein said means for supplying said second pulses to said ignition timing control means includes combining means, responsive to said second and third pulses, for forming fourth pulses having first and second edges delayed from corresponding first and second edges of said first pulses by said first time period.

8. Apparatus as specified in claim 5 or claim 6 wherein there are provided means for varying at least one of said time periods, said means including delay control means, responsive to engine temperature, and switch means responsive to said delay control means, for connecting time constant determining components to at least one of said delay circuits.

9. Apparatus as specified in claim 7 wherein there are provided means for varying at least one of said time periods, said means including delay control means responsive to engine temperature and switch means responsive to said delay control means for connecting time constant determining components to at least one of said delay circuits.

* * * * *